United States Patent [19]
Ludwig

[11] 3,729,132
[45] Apr. 24, 1973

[54] THERMAL CONTROL VALVE
[75] Inventor: George C. Ludwig, Amityville, N.Y.
[73] Assignee: The Bendix Corporation, Southfield, Mich.
[22] Filed: Jan. 25, 1971
[21] Appl. No.: 109,492

[52] U.S. Cl. ................. 236/101, 123/117.1, 236/87
[51] Int. Cl. ............................................ G05d 23/02
[58] Field of Search ................................. 123/117 A; 137/513.3, 468; 236/87, 93

[56] References Cited

UNITED STATES PATENTS

| 2,029,357 | 2/1936 | Chryst | 137/468 |
| 3,659,501 | 3/1970 | Beard | 123/117 A |
| 3,506,194 | 4/1970 | Ressequie | 236/87 |
| 2,767,733 | 10/1956 | Anderson | 137/513.3 |
| 3,606,871 | 9/1971 | Gropp et al. | 123/117 A |

Primary Examiner—Laurence M. Goodridge
Attorney—S. H. Hartz and Plante, Hartz, Smith and Thompson

[57] ABSTRACT

A valve has a body with inlet and outlet ports and a calibrated orifice for providing restricted flow at least in one direction between the inlet and outlet ports. Valve means provides unrestricted flow in the opposite direction between the inlet and outlet ports and a bi-metal element responsive to temperature operates the valve means at a predetermined temperature to provide unrestricted flow in both directions between the inlet and outlet ports.

7 Claims, 3 Drawing Figures

Patented April 24, 1973

INVENTOR.
George C Ludwig

BY

ATTORNEY

INVENTOR.
George C. Ludwig
BY
ATTORNEY

THERMAL CONTROL VALVE

The invention relates to valves for controlling fluid flow and more particularly to valves responsive to temperature.

In pollution control of automobiles it has been found that internal combustion engines generate undesirable oxides of nitrogen especially when the car accelerates at speeds less than 30 miles per hour. Generation of such oxides of nitrogen can be reduced substantially by preventing normal spark advance when the engine is operating under these conditions. However, this causes the engine to operate sluggishly. Such operation can be tolerated when the engine ambient temperature is above approximately 60°F but when the temperature is below 60°F the engine tends to stall and this creates serious problems.

A valve constructed according to the invention is especially adapted for preventing normal spark advance at speeds below approximately 30 miles per hour when the engine ambient temperature is above approximately 60°F but permits normal engine operation at speeds above 30 miles per hour at any temperature and at speeds below 30 miles per hour when the engine ambient temperature is below 60°F. The valve is inserted in the suction line between the carburetor spark port and the distributor vacuum advance cylinder.

The valve comprises a body having inlet and outlet ports, a calibrated orifice for providing restricted flow in one direction between the inlet and outlet ports, valve means for providing unrestricted flow in the opposite direction between the inlet and outlet ports, and means responsive to temperature for operating the valve means at a predetermined temperature to provide unrestricted flow in both directions between the inlet and outlet ports.

When the engine ambient temperature is above 60°F the calibrated orifice is effective in restricting air flow from the distributor vacuum advance cylinder to the carburetor spark port, but air flow from the carburetor spark port to the distributor vacuum advance cylinder opens the valve means and air flow is unrestricted. When the engine ambient temperature is below approximately 60°F then the temperature responsive means opens the valve means and provides unrestricted flow in both directions between the carburetor spark port and distributor vacuum advance cylinder.

A valve of the kind described prevents normal spark advance at temperatures above approximately 60°F. The calibrated orifice meters air flow from the distributor to the carburetor when the spark port pressure is lower than the vacuum advance chamber pressure so that the spark advances very slowly. The orifice is calibrated so that 25 to 30 seconds are required to bleed air from the distributor vacuum advance chamber to the carburetor spark port. This arrangement prevents normal spark advance until the car accelerates to about 30 miles per hour. When the spark port pressure increases the spark is retarded immediately because air flow from the carburetor spark port to the distributor vacuum advance chamber is unrestricted by the valve means.

When the engine ambient temperature is below 60°F a bi-metal element opens the valve means and provides for unrestricted air flow in both directions so that spark advance under this condition is normal. With this arrangement when the engine is cold, the spark advances normally, but after the engine ambient temperature reaches 60°F then the spark advances only slowly to avoid generation of undesireable oxides of nitrogen.

One object of the present invention is to provide a valve which restricts flow in one direction and provides unrestricted flow in the opposite direction.

Another object is to provide a valve which has temperature responsive means which opens the valve for unrestricted flow in both directions at a predetermined temperature.

Another object is to provide a valve which is simple in design and inexpensive to manufacture.

Another object is to provide a valve which is especially adapted to reduce pollution in internal combustion engines.

Another object is to provide a valve especially adapted for use in an internal combustion engine between the carburetor spark port and distributor vacuum advance cylinder to permit normal operation of the engine at lower engine ambient temperatures and to restrict spark advance at higher engine ambient temperatures to avoid generation of oxides of nitrogen.

Another object is to provide a valve for use in automobile engines which permits substantially normal spark advance above speeds of approximately 30 miles per hour.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
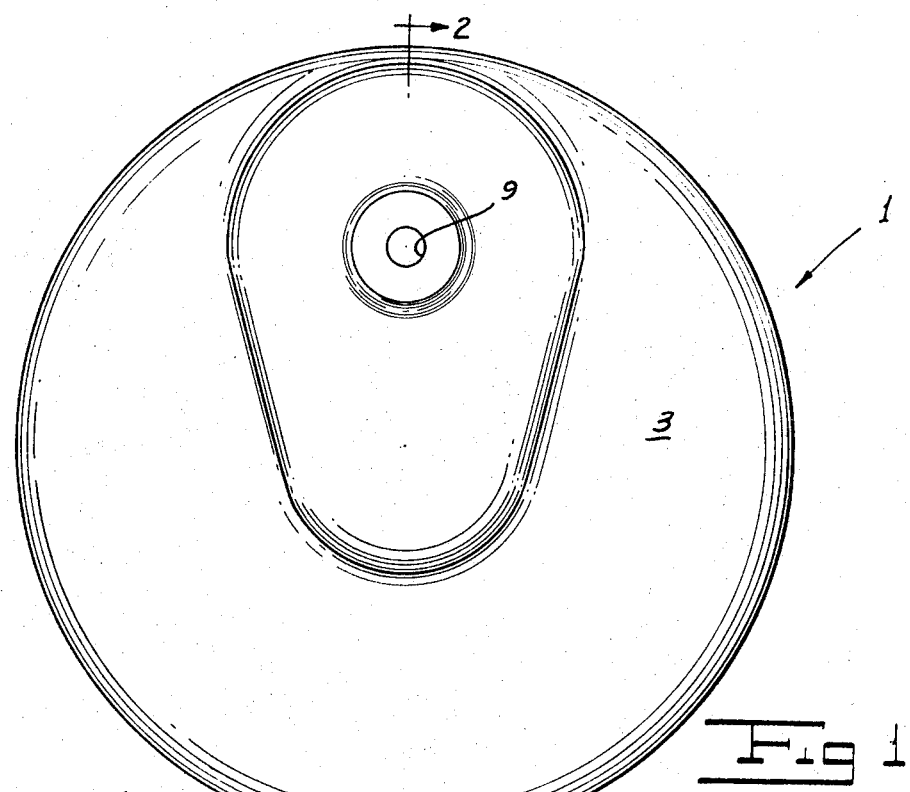
FIG. 1 is a top view of a valve constructed according to the invention.

Referring to the drawings, the novel valve constructed according to the invention and shown therein has body 1 comprised of a cuplike outer cover 3 assembled on a cuplike inner cover 5 and forming a cylindrical chamber 7 therebetween. Outer cover 3 has an inlet port 9 connected to chamber 7 and inner cover 5 has an outlet port 11 leading from chamber 7. A filter 13 of paper or other suitable material is retained by a washer 15 in a cylindrical recess 17 in outer cover 3 connected to inlet port 9 to filter air as it passes through chamber 7.

Inner cover 5 has an annular groove 19 formed therein for receiving an "O" ring 21. A disc 23 divides chamber 7 into two parts 7a, 7b and is urged into engagement with "O" ring 21 by a coil spring 25 having one end seated on the disc and the other end seated in a cylindrical cavity 27 in outer cover 3. Disc 23 has a calibrated orifice 29 substantially centrally in the disc for restricting air flow from inlet port 9 to outlet port 11. The tension of spring 25 is such that when air flow is from outlet port 11 to inlet port 9, disc 23 is lifted off the "0" ring 21 in opposition to the spring, and air flow in this direction is unrestricted.

Figure 2:
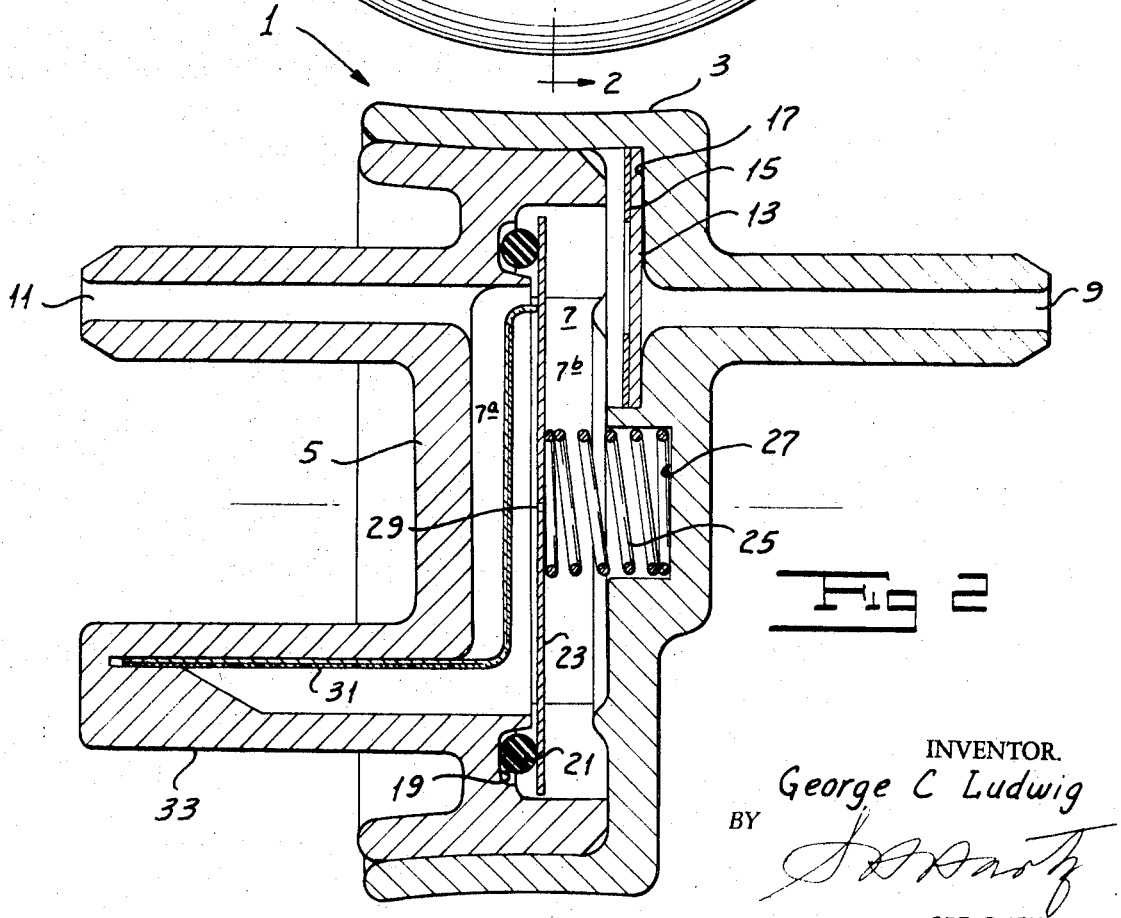
FIG. 2 is a vertical section taken approximately on the line 2—2 of FIG. 1 and shows the valve when the engine ambient temperature is above a predetermined temperature.
Figure 3:
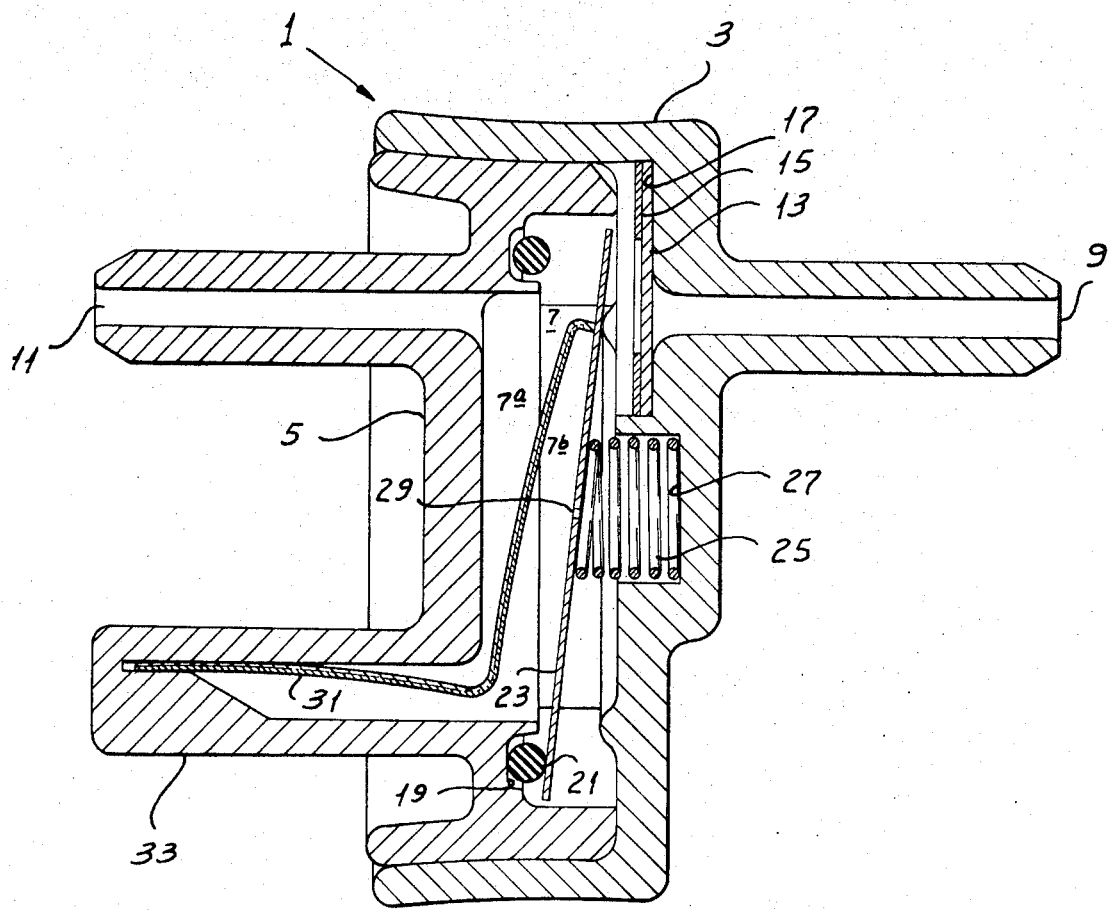
FIG. 3 is a view similar to FIG. 2 showing the valve when the engine ambient temperature is below the predetermined temperature.

An "L" shaped bi-metal element 31 of materials having different coefficients of expansion has one end secured to an extension 33 on inner cover 5. Element 31 extends into part 7a of chamber 7, and the other end of bi-metal element 31 is free and is positioned adjacent disc 23. When the temperature is above the predetermined temperature bi-metal element 31 is substantially in the position shown in FIG. 2 and when the temperature is below the predetermined temperature the bi-metal element flexes as shown in FIG. 3 and the free end of the bi-metal element engages disc 23 and lifts the disc off of "0" ring 21 in opposition to spring 25 so air flows unrestricted around the disc in both directions.

When a valve constructed according to the invention is used to control the spark advance in an internal combustion engine in an automobile as described above, outlet port 11 is connected to the carburetor spark port and inlet port 9 is connected to the distributor vacuum advance chamber.

When the engine ambient temperature is above approximately 60°F and the pressure at outlet port 11 is lower than pressure at inlet port 9, air flows from the inlet port 9 through filter 13 into part 7b of chamber 7 through calibrated orifice 29 into part 7a of chamber 7 and through outlet port 11. When the pressure at inlet port 9 is lower than the pressure at outlet port 11, air flows from outlet port 11 into part 7a of chamber 7. The air flow lifts disc 23 off of "0" ring 21 so that air flows around disc 23 into part 7b of chamber 7, through filter 13 and inlet port 9. When the ambient temperature is below approximately 60°F then bi-metal element 31 flexes as shown in FIG. 3 and lifts disc 23 off of "0" ring 21 and air flows unrestricted in both directions. In one direction air flows from inlet port 9 through filter 13 into part 7b of chamber 7 around disc 23 to outlet port 11 and in the opposite direction from outlet port 11 into part 7a of chamber 7 around disc 23 into part 7b of chamber 7 and through filter 13 and inlet port 9.

The valve prevents normal spark advance at temperatures above approximately 60°F because of restricted air flow from inlet port 9 to outlet port 11 but provides for normal engine operation at temperatures below approximately 60°F because air flow from inlet port 9 to outlet port 11 is unrestricted. During acceleration up to a speed of approximately 30 miles per hour air bleeds from inlet port 9 through calibrated orifice 29 to outlet port 11. When the automobile attains a speed of approximately 30 miles per hour, the spark is substantially fully advanced and the engine operates normally at speeds above 30 miles per hour.

While the valve has been described for use in connection with internal combustion engines in automobiles to control pollution, it should be understood that the valve may be used for any other suitable purpose where fluid flow in one direction must be restricted and in the opposite direction must be unrestricted but an override is required at a predetermined temperature to provide for unrestricted flow in both directions.

While the valve described closes above and opens below a predetermined temperature, it should be understood that the valve may be provided with a suitable bi-metal element for maintaining the valve opened above and closed below a predetermined temperature.

What is claimed is:

1. A device of the kind described comprising a body having inlet and outlet ports, valve means for restricting flow more in one direction than in the opposite direction between the inlet and outlet ports, said valve means including a free floating disc urged against sealing means by spring means and arranged so that flow in said opposite direction lifts the desk from the sealing means in opposition to the spring, and means responsive to temperature for operating said valve means at a predetermined temperature to provide unrestricted flow in both directions between said inlet and outlet ports.

2. A device as described in claim 1 wherein said free floating disc has a calibrated orifice therein.

3. A device of the kind described in claim 1 in which the means responsive to temperature is a bi-metal element of materials having different coefficients of expansion arranged to flex when the temperature is below a predetermined temperature and lift the disc from the sealing means in opposition to the spring and permit unrestricted flow around the disc in both directions.

4. A device of the kind described in claim 3 in which the bi-metal element is substantially L-shaped and has one end fixed to the body and the other end engaging the disc.

5. A device of the kind described comprising a body having inlet and outlet ports, valve means for restricting flow more in one direction than in the opposite direction between said inlet and outlet ports, and means responsive to temperature for operating said valve means at a predetermined temperature to provide unrestricted flow in both directions between said inlet and outlet ports, said means responsive to temperature being fabricated from bi-metal materials having different coefficients of expansion.

6. In combination with a flow controlling valve of the type having a body with first and second ports therein, a valve element disposed intermediate the first and second ports for controlling flow therebetween and positionable in response to pressure differentials, resilient means cooperatively associated with the body operative to bias the valve element towards a closed position, wherein the improvement comprises:
temperature responsive means secured to the body and operative to overcome the bias of the resilient means at a predetermined temperature thereby opening the valve element, said temperature responsive means including a bimetal element of materials having different coefficients of expansion.

7. A device of the kind described in claim 6 including in addition means for communicating minimum flow between the first and second ports regardless of the position of the valve element.

* * * * *